(12) United States Patent
Chen

(10) Patent No.: US 10,979,111 B2
(45) Date of Patent: Apr. 13, 2021

(54) SIGNAL PROCESSING METHOD, DEVICE, AND STORAGE MEDIUM

(71) Applicant: GUANGDONG OPPO MOBILE TELECOMMUNICATIONS CORP., LTD., Guangdong (CN)

(72) Inventor: Wenhong Chen, Guangdong (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 0 days.

(21) Appl. No.: 16/709,327

(22) Filed: Dec. 10, 2019

(65) Prior Publication Data

US 2020/0153485 A1 May 14, 2020

Related U.S. Application Data

(63) Continuation of application No. PCT/CN2018/106281, filed on Sep. 18, 2018.

(51) Int. Cl.
| | |
|---|---|
| *H04K 1/10* | (2006.01) |
| *H04L 27/28* | (2006.01) |
| *H04B 7/0456* | (2017.01) |
| *H04W 72/04* | (2009.01) |
| *H04B 7/0452* | (2017.01) |

(52) U.S. Cl.
CPC .......... *H04B 7/046* (2013.01); *H04B 7/0452* (2013.01); *H04W 72/042* (2013.01); *H04W 72/044* (2013.01)

(58) Field of Classification Search
CPC ... H04B 7/046; H04B 7/0452; H04W 72/044; H04W 72/042; H04W 76/10; H04L 5/0026

USPC .......................................... 375/260, 295, 316
See application file for complete search history.

(56) References Cited

U.S. PATENT DOCUMENTS

| | | | |
|---|---|---|---|
| 2008/0181285 A1* | 7/2008 | Hwang | ............... H04B 7/0452 375/148 |
| 2009/0175375 A1 | 7/2009 | Zhang | |
| 2015/0282144 A1 | 10/2015 | Tomeba et al. | |
| 2015/0349932 A1* | 12/2015 | Onodera | ............... H04L 5/0026 370/329 |

(Continued)

FOREIGN PATENT DOCUMENTS

| | | |
|---|---|---|
| CN | 105515625 A | 4/2016 |
| CN | 106452662 A | 2/2017 |

(Continued)

OTHER PUBLICATIONS

The EESR of corresponding European application No. 18919398.0, dated Jul. 28, 2020.

(Continued)

*Primary Examiner* — Phuong Phu
(74) *Attorney, Agent, or Firm* — Ladas & Parry LLP

(57) ABSTRACT

A signal processing method includes: receiving by a terminal device, first precoding indication information, where the first precoding indication information is used for indicating related information for precoding a data signal; and processing, by the terminal device, a received data signal based on the first precoding indication information. And another signal processing method, a terminal device, a network device and a storage medium are provided.

8 Claims, 4 Drawing Sheets

(56) References Cited

U.S. PATENT DOCUMENTS

2016/0049997 A1* 2/2016 Onodera .............. H04W 76/10
370/329
2016/0065257 A1 3/2016 Fujii

FOREIGN PATENT DOCUMENTS

EP          2525518 A1   11/2012
JP       2013030940 A1    2/2013

OTHER PUBLICATIONS

NTT Docomo:"Non-linear precording for NR", 3GPP Draft; R1-1702848_NR_NLP_Final, 3rd Generation Partneship Project (3GPP), Mobile Competence Centre; 650, Route Des Lucioles; F-06921 Sophia-Antipolis Cedex; France, vol. RAN WG1, No. Athens, Greece; Feb. 13, 2017-Feb. 17, 2017 Feb. 12, 2017(Feb. 12, 2017, XP051209993.

* cited by examiner

SIGNAL PROCESSING METHOD, DEVICE, AND STORAGE MEDIUM

CROSS-REFERENCE TO RELATED APPLICATIONS

This application is a continuation of international Application No. PCT/CN2018/106281, filed on Sep. 18, 2018, which is hereby incorporated by reference in its entirety.

TECHNICAL FIELD

The present disclosure relates to the field of wireless communication technologies and, in particular, to a signal processing method, a device and a storage medium.

BACKGROUND

In the current new radio (NR) technology, a linear precoding technology is commonly adopted. Even though the linear precoding technology has a low complexity, it also has a limited preceding gain, especially in a scenario of multi-user multiple-input multiple-output (MU-MIMO). Therefore, a non-linear precoding technology is widely researched as an effective means for improving the preceding gain. A vector perturbation (VP) preceding technology is one of the non-linear precoding technologies, which can provide a better downlink transmission performance, and at the same time, it is suitable for downlinks of a single-user system and a multi-user system. However the current new radio (NR) system does not support a solution of precoding a data signal based on the VP.

SUMMARY

In order to solve the technical problem mentioned above, embodiments of the present disclosure provide a signal processing method, a device and a storage medium, which can implement the preceding on a data signal based on the VP in a NR system.

In a first aspect, an embodiment of the present disclosure provides a signal processing method, including: receiving, by a terminal device, first precoding indication information, where the first precoding indication information is used for indicating related information for precoding a data signal;

processing, by the terminal device, a received data signal based on the first precoding indication information, where the first precoding indication information includes at least one of the following:

perturbation coefficient values corresponding to different modulation manners of a data signal;

a perturbation coefficient value corresponding to a modulation manner adopted by the currently transmitted data signal;

indication information for indicating whether the terminal device to perform a modulo operation on the data signal;

information of a perturbation vector value, and/or a symbol index corresponding to the perturbation vector value.

In a second aspect, an embodiment of the present disclosure provides a signal processing method, including: determining, by a network device, a target perturbation vector based on channel information;

obtaining a data signal on which a perturbation is added, based on the target perturbation vector and a perturbation coefficient value;

precoding the data signal on which the perturbation is added, and transmitting the data signal that is precoded;

In a third aspect, an embodiment of the present invention provides a terminal device, including:

a receiving unit, configured to receive first precoding indication information, where the first precoding indication information is used for indicating related information for precoding a data signal;

a first processing unit, configured to process a received data signal based on the first precoding indication information, where the first precoding indication.

information includes at least one of the following:

perturbation coefficient values corresponding to different modulation manners of a data signal;

a perturbation coefficient value corresponding to a modulation manner adopted by the currently transmitted data signal:

indication information for indicating the terminal device whether to perform a modulo operation on the data signal;

information of a perturbation vector value, and/or a symbol index corresponding to the perturbation vector value.

In a fourth aspect, an embodiment of the present disclosure provide a network device, the network device includes:

a second processing unit, configured to determine a target perturbation vector based on channel information; obtain a data signal on which a perturbation is added, based on the target perturbation vector and a perturbation coefficient value, and precode the data signal on which the perturbation is added;

a transmitting unit, configured to transmit the data signal that is precoded.

In a fifth aspect, an embodiment of the present disclosure provides a terminal device, including: a processor and a memory configured to store a computer program that is executable on the processor, where the processor is configured to perform the steps of the above signal processing method performed by the terminal device.

In a sixth aspect, an embodiment of the present disclosure provides a storage medium having an executable program stored thereon, where the executable program, when being executed bye a processor, implements the above signal processing method performed by the terminal device.

In a seventh aspect, an embodiment of the present disclosure provides a storage medium having an executable program stored thereon, where the executable program, when being executed by a processor, implements the above signal processing method performed by the network device.

In the information processing method according to the present disclosure, the network device determines the target perturbation vector based on the channel information, acquires the data signal on which the perturbation is added based on the target perturbation vector and the perturbation coefficient value, and precodes the data signal on which the perturbation is added, which implements the precoding of the data signal based on the VP in the NR system.

DETAILED DESCRIPTION OF THE EMBODIMENTS

Figure 1:
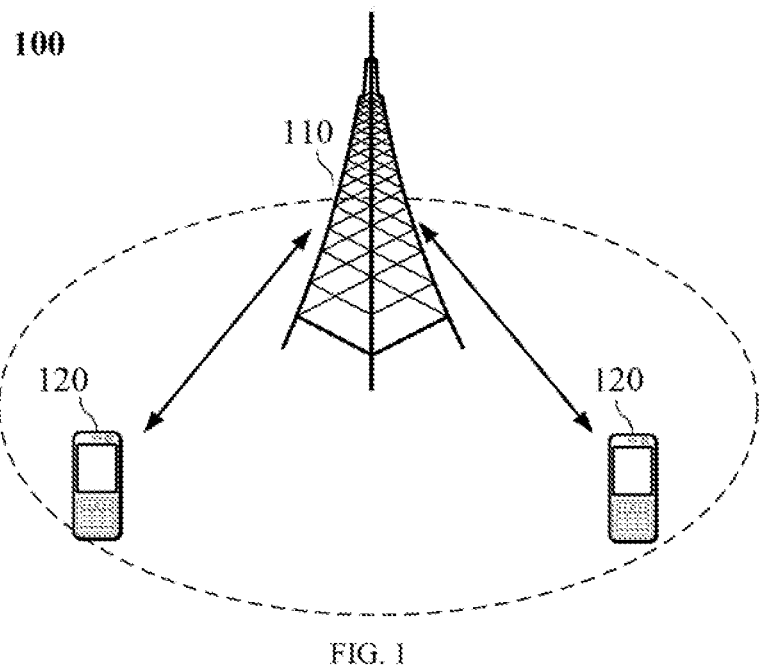
FIG. 1 is a schematic structural diagram of a constitution of a communication system according to an embodiment of the present disclosure.

For more thorough understanding of features and technical contents of embodiments of the present disclosure, implementations of the embodiments of the present, disclosure will be described in detail with reference to the drawings. The drawings are merely used for illustration, instead of limiting the embodiments of the present disclosure.

Before a detailed description of the embodiments of the present disclosure, the VP precoding technology is briefly described first.

Since the VP precoding technology can obtain better performance than the conventional zero-forcing precoding technology, and is also suitable for downlinks of a single-user system and a multi-user system at the same time, in the VP precoding technology, a transmitting end selects one VP to shape a transmitted symbol, and a receiving end directly performs a decision after eliminating the VP using a simple modulo operation.

The applicant has founded that searching of an optimal perturbation vector in the VP precoding technology has a high complexity, when performing preceding on a data signal based on the VP preceding technology. Specifically, the optimal perturbation vector is acquired by a full search in a space $\mathcal{L} = \{\mathbb{Z}^K + j\mathbb{Z}^K\}$, that is, a machine learning (ML) solution. However, as $\mathcal{L}$ has no boundary, the full search in the space $\mathcal{L} = \{\mathbb{Z}^K + j\mathbb{Z}^K\}$ cannot be achieved.

In order to solve the problem that the full search in the space $\mathcal{L} = \{\mathbb{Z}^K + j\mathbb{Z}^K\}$ cannot be achieved, the applicant proposes to perform a partial spatial search, such as a sphere encoding vector perturbation (SE-VP). However, an algorithm of the sphere encoding has high complexity, which limits the actual application of the VP precoding solution. Alternatively, a lattice reduction aided vector perturbation (LAR-VP) is proposed, although this precoding technology has a lower complexity than that of the SE-VP, in an actual channel, preceding with multiple physical resource blocks (PRB) does not produce a larger performance gain comparing with the linear precoding technology in the related technologies.

Since all perturbation vectors added in the VP precoding are real integers, there are two statistical Characteristics of perturbation vectors added to data signals in the VP precoding:

for a perturbation vector $l = [l_1, \ldots, l_k, \ldots, l_K]^T$, let n represent the number of non-zero elements in l, P(n) represent a probability that the number of non-zero elements in l is n, and $u_k$ represent a value of a real part or an imaginary part of a kth modulation symbol.

A first statistical characteristic is that: the numbers of non-zero elements in the perturbation vectors are concentrated at 1 and 2, and the probability of being greater than 2 is small, where P(n=0), P(n=1)>P(n=2), P(n>2)≤0.1. That is, for transmitted data s, in most situations, there is no need to add a perturbation, or perturbation(s) is added on one or two positions. Therefore, there is a high probability that l is the three cases of $[0, \ldots, 0]^T$, $[0, \ldots, 0, 1_k, 0, \ldots, 0]^T$ and $[0, \ldots, 1_k, \ldots, 1_l, \ldots 0]^T$.

A second statistical characteristic is that: real part values and imaginary parts values of the non-zero elements mainly are 0 and ±1, and a statistical probability of real part values is shown in Table 1 below. The probability of the imaginary part value is opposite to the real part value. For example, for a modulation symbol 1-j, $u_k=1$ if a perturbation $l_k$ to be added on the 1-j, then the probability that the real part of $l_k$ is 0 is 0.79, −1 is 0.1859, and 1 is 0.02.

TABLE 1

|  | Original perturbation $p(l_k\|u_k = -1)$ | vector $p(l_k\|u_k = 1)$ |
| --- | --- | --- |
| $l_k = -1$ | 0.0200 | 0.1859 |
| $l_k = 0$ | 0.7941 | 0.7941 |
| $l_k = 0$ | 0.1859 | 0.0200 |

Based on the foregoing analysis, the embodiments of the present disclosure provide a signal processing method, where the size of a search codebook is limited through finite lattice points based on the sparsity of the perturbation vector distribution and the concentration of their specific values, and the search range is further reduced by setting a threshold value of the Euclidean distance, and at the same time, an optimal terminal device combination is found by a traversal search to add the perturbation.

The present disclosure provides a signal processing method, and the technical solutions in the embodiments of the present application can be applied to various communication systems, such as a global system of mobile communication (GSM) system, a code division multiple access (CDMA) system, a wideband code division multiple access (WCDMA) system, a general packet radio service (GPRS), a long term evolution (LTE) system, an LTE frequency division duplex (FDD) system, an LTE time division duplex (TDD) system, a universal mobile telecommunication system (UMTS) or a worldwide interoperability for microwave access (WiMAX) communication system, or a 5G system, etc.

Exemplarily, FIG. 1 shows a communication system 100 applied in an embodiment of the present application. The communication system 100 may include a network device 110. The network device 110 may be a device that communicates with a terminal 120 (or referred to as a communication terminal, a terminal). The network device 110 may provide a particular geographic area with communication coverage and may communicate with a terminal located within the coverage. In an implementation, the network device 110 may be a base station (base transceiver station, BTS) in the GSM system or the CDMA system, or a base station (NodeB, NB) in the WCDMA system, or an evolved base station (evolutional Node B, eNB or eNodeB) in the LIE system, or a wireless controller in a cloud radio access network (CRAN), alternatively, the network device may be a mobile switching center, a relay station, an access point, a vehicle-mounted device, a wearable device, a hub, a switch, a network bridge, a router, a network side device in the 5G network, or a network device in a future evolutional public land mobile network (PLMN), etc.

The communication system 100 also includes at least one terminal 120 located within the coverage of the network device 110. "Terminals" as used herein include, but are not limited to, being connected via a wired line, such as connected via a public switched telephone network (PSTN), a digital subscriber line (DSL), a digital cable, a direct cable; and/or to another data connection network; and/or via a wireless interface, such as a cellular network, a wireless local area network (WLAN), a digital television network such as a DVB-H network, a satellite network, an AM-FM broadcast transmitter; and/or to an apparatus of another terminal configured to receive/transmit a communication signal; and/or an internet of things (IoT) device. The terminals configured to communicate via the wireless interface may be referred to as "wireless communication terminals", "wireless terminals" or "mobile terminals". Examples of the mobile terminals include, but are not limited to, satellite or cellular phones; personal communications system (PCS) terminals that can combine cellular radio phones with data processing, fax, and data communication capabilities; and may include radio phones, pagers, Internet/Intranet accesses, Web browsers, memos, calendars, and/or PDAs for global positioning system (GPS) receivers; and conventional laptop and/or handheld receivers or other electronic apparatuses including radio phone transceivers. The terminals may refer to access terminals, user equipment (UE), subscriber units, subscriber stations, mobile stations, mobile platforms, remote stations, remote terminals, mobile devices, user terminals, terminals, wireless communication devices, user agents, or user devices. The access terminals may be cellular phones, cordless phones, session initiation protocol (SIP) phones, wireless local loop (WLL) stations, personal digital assistants (PDA), handheld devices with wireless communication functions, computing devices or other processing devices vehicle-mounted devices and wearable devices connected to wireless modems, terminals in the future 5G network, or terminals in the future evolutional PLMN, or the like.

In an implementation, device to device (D2D) communication can be performed between the terminal devices 120.

In an implementation, the 5G system or the 5G network may also be referred to as an NR system or an NR network.

FIG. 1 exemplarily shows one network device and two terminals. In an implementation, the communication system 100 may include multiple network devices and other number of terminals may be included within the coverage of each of the network devices, which is not limited in the embodiment of the present application.

In an implementation, the communication system 100 may further include other network entities, such as a network controller, a mobility management entity, which is not limited in the embodiment of the present application.

It should be understood that, in the embodiment of the present application, a device with a communication function in the network/system may be referred to as a communication device. Taking the communication system 100 shown in FIG. 1 as an example, the communication device may include a network device 110 and a terminal 120 having communication functions, while the network device 110 and the terminal 120 may be specific devices described above, and of which the details will not be described herein. The communication device may also include other devices in the communication system 100, for example, other network entities such as a network controller, a mobility management entity and the like, which are not limited in the embodiment of the present application.

Figure 2:
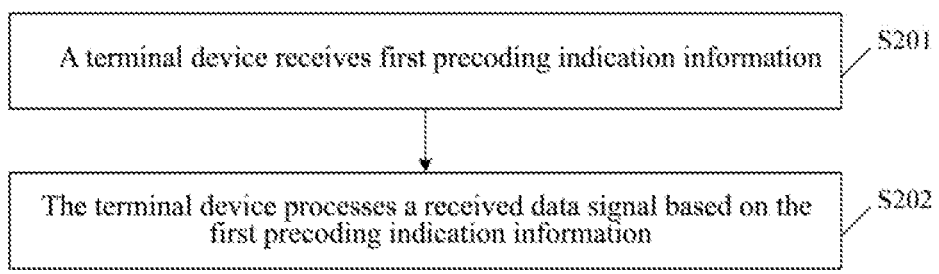
FIG. 2 is a schematic flowchart of an optional processing process of a signal processing method applied to a terminal device according to an embodiment of the present disclosure.

An optional processing flow of a signal processing method applied to a terminal device according to the embodiment of the present disclosure, as shown in FIG. 2, includes the following steps:

Step 201: a terminal device receives first precoding indication information.

In the embodiment of the present disclosure, the first precoding indication information is transmitted from a network device to the terminal device, and the first precoding indication information is used for indicating related information for precoding a data signal.

The first precoding indication information includes at least one of the followings:

1) perturbation coefficient values corresponding to different modulation manners of a data signal;

2) a perturbation coefficient value corresponding to a modulation manner adopted by the currently transmitted data signal;

3) indication information for indicating the terminal device whether to perform a modulo operation on the data signal;

4) information of a perturbation vector value, and/or a symbol index corresponding to the perturbation vector value.

Here, the indication information for indicating the terminal device whether to perform a modulo operation on the data signal may also be referred to as indication information of whether to add a perturbation vector. When the indication information of whether to add the a perturbation vector instructs to add the perturbation to the data signal, the terminal device is required to perform a modulo operation on the data, signal; and when the indication information of whether to add a perturbation vector instructs, not to add a perturbation to the data signal, the terminal device is not required to perform a modulo operation on the data signal. The indication information for indicating the terminal device whether to perform a modulo operation on the data signal may be notified to the terminal device by the network device through a high-level signaling or through a DCI signaling. In an implementation, the high-level signaling may be a RRC signaling.

In an implementation, when the first precoding indication information includes perturbation coefficient values corresponding to different modulation manners of a data signal, the first preceding indication information is carried in the RRC signaling transmitted by the network device to the terminal device. For example, when the modulation manner is binary phase shift keying (BPSK), the modulation order M is 2, and when the modulation manner is quadrature phase shill keying (QPSK), the modulation order M is 4. The perturbation coefficient values are obtained according to the following formula (1).

$$\tau = 2\sqrt{M} \qquad (1)$$

In an implementation, when the first precoding indication information includes the perturbation coefficient value corresponding to the modulation manner adopted by the currently transmitted data signal, the first precoding indication information is carried in the DCI transmitted by the network device to the terminal device.

In an implementation, the indication of the information of the perturbation vector value is based on a predefined vector codebook, and the information of the perturbation vector value indicates an index of the target perturbation vector in the vector codebook. Here, the preset vector codebook refers to a vector codebook that is predefined by the network equipment and the terminal equipment. The network device may adopt a quasi-static perturbation vector value, and the network device notifies the quasi-static perturbation vector value to the terminal device through the RRC signaling. The network device may also adopt a dynamic perturbation vector value, and the network device notifies the dynamic perturbation vector value to the terminal through the DCI signaling.

In the embodiment of the present disclosure, taking adding perturbations to two antennas of K transmitting antennas as an example, the preset vector codebook is as shown in Table 2 below:

TABLE 2

| | S | | | | | | | | | | | | |
|---|---|---|---|---|---|---|---|---|---|---|---|---|---|
| | 01 | 02 | 03 | 04 | 05 | 06 | 07 | 08 | 09 | 10 | 11 | 12 | 13 |
| $m_1$ | 0 | 0 | 0 | 1 | 1 | 1 | -1 | -1 | -1 | 0 | 0 | j | j |
| $m_2$ | 0 | 1 | -1 | 0 | 1 | -1 | 0 | 1 | -1 | j | -j | 0 | j |

| | S | | | | | | | | | | | |
|---|---|---|---|---|---|---|---|---|---|---|---|---|
| | 14 | 15 | 16 | 17 | 18 | 19 | 20 | 21 | 22 | 23 | 24 | 25 |
| $m_1$ | j | -j | -j | -j | 1 | 1 | -1 | -1 | j | j | -j | -j |
| $m_2$ | -j | -j | 0 | j | j | -j | j | -j | 1 | -1 | 1 | -1 |

In the above Table 2, S represents a codebook number. When S is 01, it represents a first codebook, when S is 02, it represents a second codebook, and so on. $m_1$ and $m_2$ represent perturbation vectors.

Step S202: the terminal device processes a received data signal based on the first precoding indication information.

In some embodiments, when the first precoding indication information includes the perturbation coefficient values corresponding to different modulation manners of a data signal, the terminal device processing the received data signal based on the first precoding indication information includes the following steps:

Step S2a: the terminal device the modulation manner of the current data signal, according to modulation and coding scheme (MCS) indication information carried in DCI that schedules the data signal.

In some embodiments, the terminal device receives the DCI, which schedules the data signal, transmitted by the network device, where the DCI carries the MCS indication information, and the MCS indication information is used to indicate a modulation manner of the current data signal.

Step S2b: the terminal device determines based on the modulation manner that is determined and the perturbation coefficient values corresponding to different modulation manners of a data signal, a perturbation coefficient value corresponding to the modulation manner.

In some embodiments, the terminal device searches for the perturbation coefficient value corresponding to the modulation manner of the current data signal determined in step S2a among the perturbation coefficient values corresponding to the different modulation manners of a data signal included in the first precoding indication information.

Step S2c: processing the received data signal based on the perturbation coefficient value.

Here, the processing the received data signal based on the perturbation coefficient value includes the terminal device detecting the received data signal based on the perturbation coefficient value.

In some embodiments, when the first pre-coding indication information further includes: the indication information for indicating the terminal device to perform a modulo operation on the data signal, the processing the received data signal based on the perturbation coefficient value further includes: the terminal device performs a modulo operation on the data signal.

In other embodiments, when the first precoding indication information further includes information of the perturbation vector value and a symbol index corresponding to the perturbation vector value, the processing the received data signal based on the perturbation coefficient value further includes:

The terminal device determines the target perturbation vector on the symbol corresponding to the symbol index based on the information of the perturbation vector value and the symbol index corresponding to perturbation vector value, and restores the data signal transmitted on the symbol corresponding to the symbol index based on the target perturbation vector and the perturbation coefficient value.

In still another embodiment, when the first precoding indication information further includes information of the perturbation vector value, the processing the received data signal based on the perturbation coefficient value further includes:

The terminal device determines the target perturbation vector on the symbol corresponding to the symbol index based on the information of the perturbation vector value; and restores the data signal based on the target perturbation vector and the perturbation coefficient value.

In the embodiment of the present disclosure, the restoring the data signal based on the target perturbation vector and the perturbation coefficient value is as shown in the formula (2) below:

$$s_i = \hat{s}_i - \tau F_i \quad (2)$$

Where, $F_i$ is the target perturbation vector, $\tau$ is the perturbation coefficient value, $\bar{s}_i$ is the received data signal, and $s_i$ is the restored data signal.

Another optional processing flow of the signal processing method applied to the terminal device according to the embodiment of the present disclosure is similar to the processing flow as shown in FIG. 2, except that before the step S202, the method further includes:

Step S200: the terminal device normalizes the received data signal, and performs linear detection on the normalized data signal.

In the specific implementation, when the received data signal is $y_i$, the normalized data signal is shown as the following formula (3):

$$\tilde{y}_i = \sqrt{\gamma}\, y_i \quad (3)$$

where $y_i$ is the received data signal, $\tilde{y}_i$ is the normalized data signal, and $\sqrt{\gamma}$ is the normalization coefficient.

When the linear detection is performed on the normalized data signal, if an equalization matrix of the linear detection is $G_i$, the data signal after the linear detection is performed on the normalized data signal is as shown in the following formula (4):

$$\hat{s}_i = G_i \tilde{y}_i \quad (4)$$

where, $\tilde{y}_i$ is the normalized data signal, $G_i$ is the equalization matrix of the linear detection, and $\hat{s}_i$ is the data signal after the linear detection.

Figure 3:
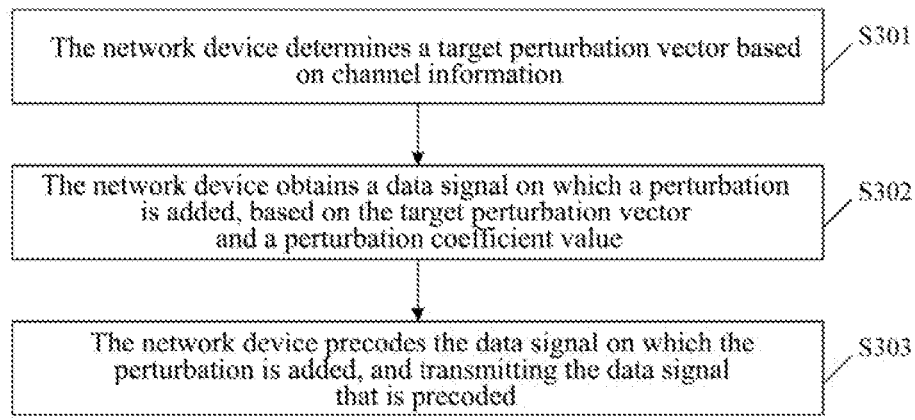
FIG. 3 is a schematic flowchart of an optional processing process of a signal processing method applied to a network device according to an embodiment of the present disclosure.

The embodiment of the present disclosure provides a signal processing method, and the processing flow thereof, as shown in FIG. 3, includes:

Step S301: the network device determines a target perturbation vector based on channel information.

Figure 4:
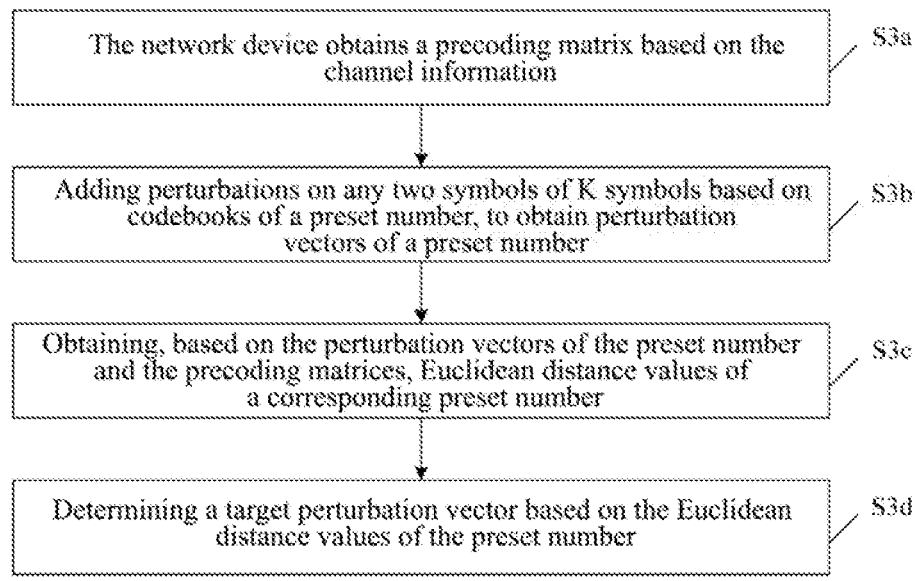
FIG. 4 is a schematic flowchart of a processing process of determining a target perturbation vector based on channel information by a network device according to an embodiment of the present disclosure.

In some embodiments, the processing flow of the network device determining the target perturbation vector based on the channel information, as shown in FIG. 4, includes the following steps:

Step S3a: the network device obtains a precoding matrix based on the channel information.

Taking the channel information being a channel matrix as an example, an inverse matrix of the channel matrix is calculated and the inverse matrix is determined as the precoding matrix, as shown in the following formula (5):

$$W = H^\dagger \quad (5)$$

where, H is $$H = \begin{bmatrix} H_1 \\ H_2 \\ \ldots \\ H_N \end{bmatrix}$$

where channel matrices of respective terminal devices are arranged in sequence, N is the number of the terminal devices, where each terminal device has X antennas and the network device has K antennas.

Step S1b: adding perturbations on any two symbols of K symbols based on codebooks of a preset number, to obtain perturbation vectors of a preset number.

In some embodiments, codebooks of a limited number are selected from the pre-defined vector codebooks based on the actual situation; when the perturbation vectors are added on P symbols, there are $C_K^P$ cases based on the difference of the symbols on which the perturbation vectors are added, where P is a positive integer less than or equal to K. Taking as an example, perturbations $m_1$ and $m_2$ are added on a first symbol and a second symbol, taking the vector codebooks shown in Table 1 as an example, the first n codebooks in Table 1 are selected, 1<n<25, then the first n codebooks are $S(1)=[0\ 0]^T$, $S(2)=[0\ 1]^T$, ..., $S(10)=[0\ j]^T$, ..., $S(s)=[m_1\ m_2]^T$, and the perturbations are added on the first symbol and the second symbol respectively. For example, when adding the perturbation vectors to two symbols of K symbols, there are $C_K^P$ cases based on the difference of the symbols on which the vector perturbations are added. And there are s possibilities for the perturbation vectors that can be obtained in one case of the $C_K^P$ cases, which respectively are $$l(i,1) = \begin{bmatrix} 0, L, & 0 & , L, & 0 & , L, 0 \\ & \uparrow & & \uparrow & \\ & \text{Anteen } a & & \text{Anteen } b & \end{bmatrix}^T,$$

$$l(i,2) = \begin{bmatrix} 0, L, & 0 & , L, & 1 & , L, 0 \\ & \uparrow & & \uparrow & \\ & \text{First Symbol} & & \text{Second Symbol} & \end{bmatrix}^T, \ldots,$$

$$l(i,10) = \begin{bmatrix} 0, L, & 0 & , L, & j & , L, 0 \\ & \uparrow & & \uparrow & \\ & \text{First Symbol} & & \text{Second Symbol} & \end{bmatrix}^T,$$

$$l(i,s) = \begin{bmatrix} 0, L, & m_1 & , L, & m_2 & , L, 0 \\ & \uparrow & & \uparrow & \\ & \text{First Symbol} & & \text{Second Symbol} & \end{bmatrix}^T.$$

Step S3c: obtaining, based on the perturbation vectors of the preset number and the precoding matrices, Euclidean distance values of a corresponding preset number.

In some embodiments, the Euclidean distance is calculated based on the following formula (6):

$$d(i,s) = \|H^\dagger(s + \tau 1(i,s))\|^2 \quad (6)$$

where, d(i,s) is the Euclidean distance value obtained by adding the perturbations on the first symbol and the second symbol by selecting s codebooks in the ith case of the $C_K^2$ cases.

Here, when there are s perturbation vectors, s Euclidean distance values can be acquired.

Step S3d: determining a target perturbation vector based on the Euclidean distance values of the preset number.

In some embodiments, for any one case of the $C_K^2$ cases, a perturbation vector corresponding to one Euclidean distance value that is less than or equal to a first threshold value is determined as the target perturbation vector.

In a specific implementation, the calculating of the Euclidean distance value may be stopped when the calculated Euclidean distance value is less than or equal to the first threshold, and the perturbation vector corresponding to the Euclidean distance value that is less than or equal to the first threshold is determined as the target perturbation vector.

In other embodiments, for one case of the $C_K^2$ cases, if the calculated s Euclidean distance values are all greater than the first threshold, the $C_K^2$ cases are traversed until the Euclidean distance value that is less than or equal to the first threshold is obtained. The perturbation vector corresponding to the Euclidean distance value that is less than or equal to the first threshold value is determined as the target perturbation vector.

In still other embodiments, when the Euclidean distance values calculated by traversing the $C_K^2$ cases are all greater than the first threshold, the minimum Euclidean distance value in each case of the $C_K^2$ cases is calculated, and the perturbation vector corresponding to minimum value among the minimum Euclidean distance values for all of the cases is determined as the target perturbation vector.

The first threshold value described in the embodiment of the present disclosure can be flexibly set according to actual conditions, and the target perturbation vector is represented as $I_{near-opt}$.

Step S302: the network device obtains a data signal on which a perturbation is added, based on the target perturbation vector and a perturbation coefficient value.

Here, the network device first determines the perturbation coefficient value, based on the modulation manner of the data signal.

The correspondence between the modulation manner and the perturbation coefficient value is as shown in the above formula (1), and will not be repeated herein.

In the embodiment of the present disclosure, the network device determines the data signal on which the perturbation is added, according to the following formula (7).

$$s' = s + \tau 1_{near\text{-}opt} \qquad (7)$$

where, $\tau$ is the perturbation coefficient value, $I_{near\text{-}opt}$ is the target perturbation vector, s is the data signal, and s' is the data signal on which the perturbation is added.

Step S303: the network device precodes the data signal on which the perturbation is added, and transmitting the data signal that is precoded.

Here, before transmitting the precoded data signal, the network device may also normalize the precoded data signal and transmit the normalized data signal to the terminal device.

In the embodiment of the present disclosure, the data signal on which the perturbation added is precoded based on the following formula (8).

$$x = H^\dagger (s + \tau 1_{near\text{-}opt}) \qquad (8)$$

where, x is the data single on which the perturbation added.

In the embodiment of the present disclosure, the precoded data signal is normalized based on the following formula (9).

$$\tilde{x} = \frac{1}{\sqrt{\gamma}} H^\dagger (s + \tau 1_{near\text{-}opt}) \qquad (9)$$

where, $$\frac{1}{\sqrt{\gamma}}$$

is the normalization coefficient, and $\gamma = \|H^\dagger(s+\tau I_{near\text{-}opt})\|^2$.

In the embodiment of the present disclosure, before transmitting the pre-coded data signal to the terminal device, the network device further transmits first precoding indication information to the terminal device, where the first precoding indication information is used for indicating information related to precoding the data signal;

where, the first precoding indication information includes at least one of the following:

1) perturbation coefficient values corresponding to different modulation manners of a data signal;

2) a perturbation coefficient value corresponding to a modulation manner adopted by the currently transmitted data signal;

3) indication information for indicating the terminal device whether to perform a modulo operation on the data signal;

4) information of a perturbation vector value, and/or a symbol index corresponding to the perturbation vector value.

In the following, taking that the number of transmitting antennas of the network device is 8, the number of terminal devices is 2, and each terminal device is configured with 4 receiving antennas and the modulation manner of the data signal is 4 QAM as an example, the processing flow of the signal processing method according to the embodiment of the present disclosure is illustrated. Yet another optional processing flow of the signal processing method includes the following steps:

Step S401: the network device calculates an inverse matrix of the channel matrix as a precoding matrix based on a ZF criterion.

At this time, the precoding matrix is $W=H^\backslash$, the channel matrix is $$H = \begin{bmatrix} H_1 \\ H_2 \end{bmatrix}.$$

Step S402: the network device determines a perturbation coefficient value and a target perturbation vector.

In the embodiment of the present disclosure, since the modulation order is 4, the perturbation coefficient value obtained according to the above formula (1) is 4.

In the embodiment of the present disclosure, 2 symbols are selected from the 8 symbols corresponding to the 8 antennas of the network device, to add perturbations thereon, and then there are $C_9^2=28$ possible cases. For the first case of the $C_8^2$ cases, that is the case of i=1, the vector perturbations are then added on a symbol 1 and a symbol 2, and no vector perturbation is added on symbols 3 to 8. If the number of the selected codebooks is s=3, $S(1,1)=[0\ 0]^T$, $S(1,2)=[0\ 1]^T$ and $S(1,3)=[0\ -1]^T$ are selected from the codebook in sequence, and the corresponding vector perturbations are $I(1,1)=[0,0,0,0,0,0,0,0]^T$, $I(1,2)=[0,1,0,0,0,0,0,0]^T$ of and if $d(\bar{i},\bar{s}) \leq V_{th}$, then the $I(\bar{i},\bar{s})$ corresponding to $d(i,s)$ is taken as the target perturbation vector $I_{near\text{-}opt}$. Otherwise, traversing the remaining combination $I(i,s)$ is continued until $d(i,s) \leq V_{th}$. Otherwise, the $I_{near\text{-}opt}$ corresponding to the minimum value from the calculated $d(i,s)$ as the target perturbation vector.

Step S403: the network device obtains a data signal an which a perturbation is added, based on the target perturbation vector and the perturbation coefficient value.

Step S404: performing preceding processing and normalization processing on the data signal on which the perturbation is added, and transmitted the data signal obtained through the normalization processing.

In the embodiment of the present disclosure, preceding the data signal on which the perturbation is added, based on the above formula (8), and normalizing the precoded data signal based on the above formula (9).

Here, the network device further transmits the precoding indication information to the terminal device before transmitting the data signal to the terminal device.

Step S405: the terminal device normalizes the received data signal with the above formula (3), after receiving the data signal and the precoding indication information.

Step S406: the terminal device performs linear detection on the normalized data signal with the above formula (4), to obtain that data signal on which the linear detection is performed.

Step S407: the terminal device determines the modulation manner of the current data signal according to the MCS indication information carried in the DCI that schedules the data signal.

It should be noted that the processing process of determining the modulation manner of the current data signal is the same as that of step S2a, which will not be repeated herein.

Step S408: the terminal device restores the data signal based on the first preceding indication information.

In some embodiments, when the first precoding: indication information includes: the perturbation coefficient values corresponding to different modulation manners of a data signal and the indication information for indicating the terminal device to perform a modulo operation on the data signal, the terminal device performs the modulo operation on the data signal with the following, formula (10).

$$s_i = \text{Mod}_r(\hat{s}_i) \tag{10}$$

where, $s_i$ is the data signal that is finally acquired by the terminal device.

When the terminal device does not need to perform the modulo operation, $\hat{s}_i$ is the data signal that is finally acquired by the terminal device.

In other embodiments, when the first precoding indication information includes: the perturbation coefficient values corresponding to different modulation manners of a data signal, information of the perturbation vector value, and the symbol index corresponding to the perturbation vector value, the terminal device can know which symbol is added with the perturbation vector and what the perturbation vector is based on the information of the perturbation vector value and the symbol index corresponding to the perturbation vector value. For example, a perturbation +j is added on the second symbol of the terminal device; the target vector is determined to be $F_i=[0+j00]^T$. Then, the data signal is restored with the above formula (2) based on the perturbation coefficient values corresponding to different modulation manners of a data signal.

The above embodiments of the present disclosure have the following technical effects:

1) by defining the size of the search codebook of the perturbation vector while traversing all the transmitted symbols, selecting two optimal transmission symbols among all the transmitted symbols to add perturbation vectors, to achieve non-linear precoding on the data signal; still performing linear preceding on the data signal of the terminal device corresponding to the symbol on which the perturbation is not added. Compared to the conventional VP precoding, the embodiment of the present disclosure can reduce the complexity of searching the perturbation vector.

2) feedfoward information transmitted by the network device to the terminal device can greatly improve the performance of the terminal device.

3) the embodiment of the present disclosure is a simplified method for joint grouping through linear ZF and non-linear VP. The perturbation vector is added by traversing all terminal device combinations to select an optimal terminal device combination, and the linear precoding processing is performed on the terminal device on which the vector perturbation is not added. Compared with the traditional VP precoding, in which first the interference processing is performed between the groups of terminal devices and then the corresponding nonlinear processing is performed in the groups of terminal devices, the implementation is simpler and the precoding gain is improved.

4) according to the present application when the network device performs non-linear precoding on the data signal, only a small amount of downlink signaling overhead is needed to notify the information required for detecting to the terminal device, and that the terminal can perform correct data signal demodulation can be ensured.

Figure 5:
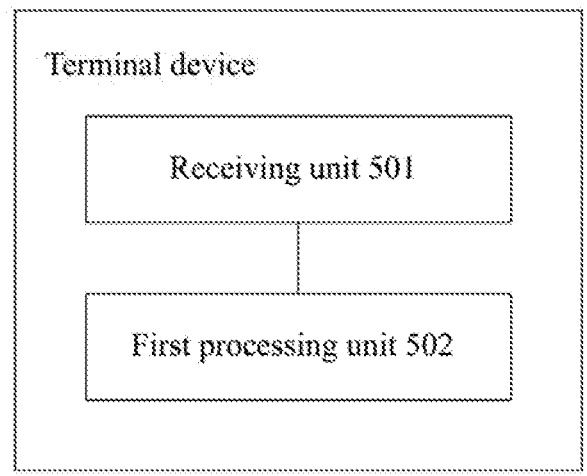
FIG. 5 is a schematic structural diagram of a constitution of a terminal device according to an embodiment of the present disclosure.

The embodiment of the present disclosure further provides a terminal device, and the constitution structure of the terminal device is shown in FIG. 5, including:

a receiving unit 501, configured to receive first precoding indication information, where the first precoding indication information is used for indicating related information for precoding a data signal;

a first processing unit 502, configured to process a received data signal based on the first precoding indication information, where the first precoding indication information includes at least one of the following:

perturbation coefficient values corresponding to different modulation manners of a data signal;

a perturbation coefficient value corresponding to a modulation manner adopted by the currently transmitted data signal;

indication information for indicating the terminal device whether to perform:

a modulo operation on the data signal;

information of a perturbation vector value, and/or a symbol index corresponding to the perturbation vector value.

In the embodiment of the present disclosure, when the first precoding indication information includes the perturbation coefficient values corresponding to different modulation manners of a data signal, the first precoding indication information is carried in a radio resource control (RRC) signaling.

In the embodiment of the present disclosure, when the first precoding indication information includes the perturbation coefficient value corresponding to the modulation manner adopted by the currently transmitted data signal, the first precoding indication information is carried in downlink control information (DCI).

In the embodiment of the present disclosure, indication of the information of the perturbation vector value is based on a predefined vector codebook; the information of the perturbation vector value indicates an index of a target perturbation vector in the vector codebook.

In the embodiment of the present disclosure, the first processing unit 502 is further configured to normalize the received data signal and perform a linear detection on the normalized data signal.

In the embodiment of the present disclosure, when the first precoding indication information includes the perturbation coefficient, values corresponding to different modulation manners of a data signal, the first processing unit 502 is configured to determine the modulation manner of the current data signal, according to modulation and coding scheme (MCS) indication information carried in DCI that schedules the data signal;

determine, based on the modulation manner that is determined and the perturbation coefficient values corresponding to different modulation manners of a data signal, a perturbation coefficient value corresponding to the modulation manner;

process the received data signal, based on the perturbation coefficient value.

In the embodiment of the present disclosure, when the first precoding indication information includes the indication information for indicating the terminal device whether to perform a modulo operation on the data signal, the first processing a unit is configured to: when the first precoding indication information indicates the terminal device not to perform the modulo operation on the data signal, not perform the modulo operation on the data signal;

or, when the first precoding indication information indicates the terminal device to perform the modulo operation on the data signal, perform the modulo operation on the data signal.

In the embodiment of the present disclosure, when the first precoding indication information includes the information of the perturbation vector value and the symbol index corresponding to the perturbation vector value, the first processing unit is configured to determine a target perturbation vector on a symbol corresponding to the symbol index, based on the information of the perturbation vector value and the symbol index corresponding to the perturbation vector value;

restore the data signal that is transmitted on the symbol corresponding to the symbol index, based on the target perturbation vector and the perturbation coefficient value.

In the embodiment of the present disclosure, when the first precoding indication information includes the information of the perturbation vector value, the first processing unit is configured to determine a target perturbation vector on a symbol corresponding to the symbol index, based on the information of the perturbation vector value;

restore the data signal, based on the target perturbation vector and the perturbation coefficient value.

Figure 6:
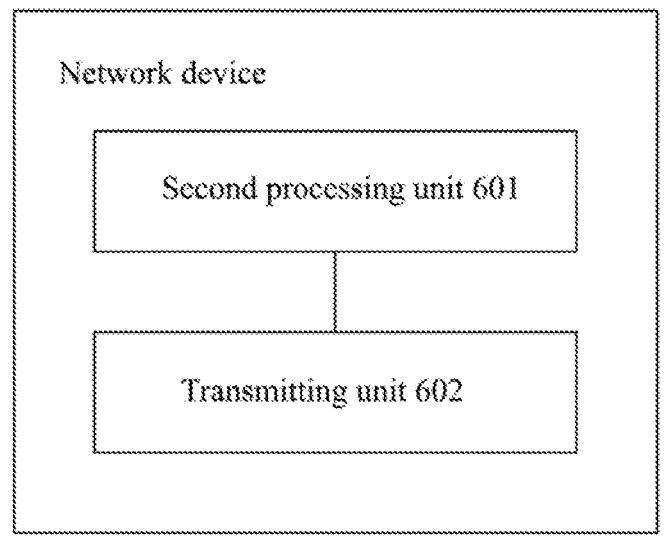
FIG. 6 is a schematic structural diagram of the constitution of a network device according to an embodiment of the present disclosure.

The embodiment of the present disclosure further provides a network device, and the constitution structure of the network device is shown in FIG. 6, including:

a second processing unit 601, configured to determine a target perturbation vector based on channel information, obtain a data signal on which a perturbation is added, based on the target perturbation vector and a perturbation coefficient value, and precode the data signal on which the perturbation is added;

a transmitting, unit 602, configured to transmit the data signal that is precoded.

In the embodiment of the present disclosure, the second processing unit 601 is further configured to normalize the precoded data signal.

In the embodiment of the present disclosure, the transmitting unit 602 is further configured to transmit first precoding indication information, where the first precoding indication information is used for indicating related information for precoding the data signal;

where, the first precoding indication information includes at least one of the following:

perturbation coefficient values corresponding to different modulation manners of a data signal;

a perturbation coefficient value corresponding to a modulation manner adopted by the currently transmitted data signal;

indication information far indicating the terminal device whether to perform a modulo operation on the data signal;

information of a perturbation vector value, and/or a symbol index corresponding to the perturbation vector value.

In the embodiment of the present disclosure, the second processing unit 601 is configured to obtain a precoding matrix based on the channel information;

add perturbations on any two symbols of K symbols based on codebooks of a preset number, to obtain vector perturbations of a preset number;

obtain, based on the vector perturbations of the preset number of and the precoding matrix, Euclidean distance values of a corresponding preset number;

determine the target perturbation vector based on the Euclidean distance values of the preset number.

In the embodiment of the present disclosure, the value of the K is equal to the number of antennas of the network device.

in the embodiment of the present disclosure, the second processing strait 601 is configured to determine the vector perturbation corresponding to the Euclidean distance value that is less than or equal to the first threshold value of the preset number of Euclidean distance values as the target perturbation vector.

In the embodiment of the present disclosure, the second processing unit 601 is configured to: when the Euclidean distance values of the preset number are all greater than the first threshold, traverse the $C_K^P$ cases where P symbols on which perturbations are added are in different positions in the K symbols until an Euclidean distance value that is less than or equal to the first threshold is obtained;

determine a vector perturbation corresponding to the Euclidean distance value that is less than or equal to the first threshold value as the target perturbation vector, where P is a positive integer less than or equal to K.

In the embodiment of the present disclosure, the second processing unit is configured to: when Euclidean distance values obtained, through the traversing the $C_K^P$ cases where the P symbols on which perturbations are added are in different positions in the K symbols, are all greater than the first threshold, calculate a minimum Euclidean distance value in each case of the $C_K^P$ cases;

determine the vector perturbation corresponding to the minimum value among the minimum Euclidean distance values in each case is determined as the target perturbation vector.

An embodiment of the present disclosure further provides a terminal device, including a processor and a memory configured to store a computer program that is executable on the processor, where the processor is configured to perform, when executing the computer program, the steps of the downlink signal processing method performed by the terminal device.

An embodiment of the present disclosure further provides a terminal device, including a processor and a memory configured to store a computer program that is executable on the processor, where the processor is configured to perform, when executing the computer program, the steps of the downlink signal processing method performed by the network device.

Figure 7:
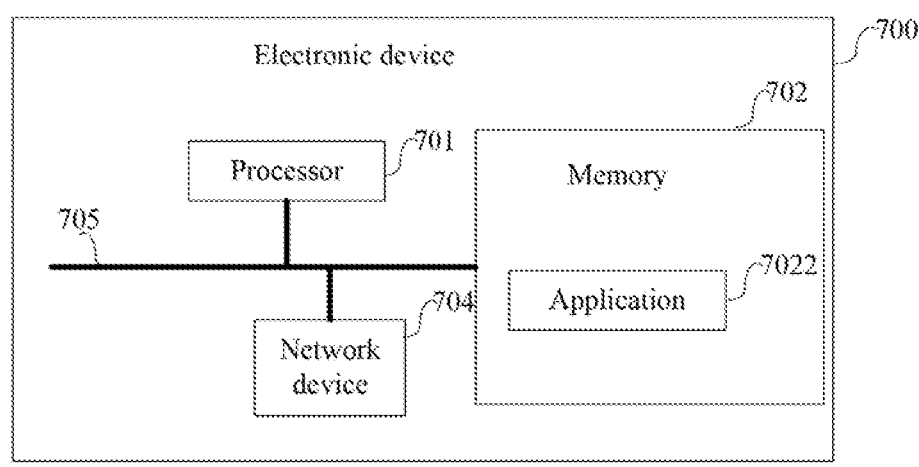
FIG. 7 is a schematic structural diagram of a hardware constitution of an electronic device according to an embodiment of the present disclosure.

FIG. 7 is a schematic structural diagram of a hardware constitution of an electronic device (a network device or a terminal device) according to an embodiment of the present disclosure, the electronic device 700 includes: at least one processor 701, a memory 702, and at least one network interface 704. Various components in electronic device 700 are coupled together via a bus system 705. It will be appreciated that the bus system 705 is configured to implement connection communication between these components. The bus system 705 includes a power bus, a control bus, and a status signal bus in addition to the data bus. However, for clarity of description, the various buses are labeled as the bus system 705 in FIG. 7.

It will be appreciated that memory 702 may be a volatile memory or a non-volatile memory, and may also include both a volatile and a nonvolatile memory. The non-volatile memory may be a ROM, a programmable read-only memory (PROM), an erasable programmable read-only memory (EPROM), or an electrically erasable programmable read-only memory (EEPROM), a ferromagnetic random access memory (FRAM), a flash memory, a magnetic surface memory; an optical disk, or a compact disc read-only memory (CD-ROM), where the magnetic surface memory may be a disk storage or a tape storage. The volatile memory may be a random access memory (RAM) that acts as an external high-speed cache. By way of example instead of limiting illustration, many forms of RAM are available, such as a static random access memory (SRAM), a synchronous static random access memory (SSRAM), a dynamic random, access (SSRAM), a dynamic random access memory (DRAM), a synchronous dynamic random access memory (SDRAM), a double data rate synchronous dynamic random access memory (DDRSDRAM), an enhanced synchronous dynamic random access memory (ESDRAM), a synchronous dynamic random access memory (SLDRAM), and a direct memory bus random access memory (DRRAM), The memory 702 described in the embodiment of the present disclosure is intended to include, but is not limited to, these and any other suitable types of memories.

The memory 702 in the embodiment of the present disclosure is configured to store various types of data to support the operation of the electronic device 700. Examples of such data include: any computer program for being executed on the electronic device 700, such as an application 7022. The program implementing the methods of the embodiments of the present disclosure may be included in the application 7022.

The method disclosed in the foregoing embodiments of, the present disclosure may he applied in the processor 701 or implemented by the processor 701. The processor 701 may be an integrated circuit chip with signal processing capabilities. In the implementation process, each step of the foregoing methods may be achieved by integrated logic circuit of hardware or an instruction in a software form in the processor 701. The processor 701 described above may be a general purpose processor, a digital signal processor (DSP), or other programmable logic device, a discrete gate or a transistor logic device, a discrete hardware component, or the like. The processor 701 can implement or perform the methods, steps, and logic blocks disclosed in the embodiments of the present disclosure. The general purpose processor may be a microprocessor or any conventional processor or the like. The steps of the method disclosed in combination with the embodiments of the present disclosure may be directly embodied as being implemented by a hardware decoding processor or a combination of hardware and software modules in the decoding processor. The software module may be located in a storage medium which is located in the memory 702, and the processor reads information in the memory 702 and performs the steps of the foregoing methods in conjunction with its hardware.

In an exemplary embodiment, the electronic device 700 may be implemented by one or more application specific integrated circuits (ASICs) digital signal processors (DSPs), programmable logic devices (PLDs), complex programmable logic devices (CPLDs), field programmable gate arrays (FPGAs), general purpose processors, controllers, micro control unit (MICUs), micro processor unit (MPUs) or other electronic components, to perform the above methods.

An embodiment of the present application further provides a computer readable storage medium configured to store a computer program.

In an implementation, the computer readable storage medium is applicable to the network device in the embodiment of the present application, and the computer program causes the computer to perform the corresponding flows implemented by the network device in each method of the embodiment of the present application, which will not be repeated herein for the sake of brevity.

In an implementation, the computer readable storage medium is applicable to the terminal device in the embodiment of the present application, and the computer program causes the computer to perform the corresponding flows implemented by the terminal device in each method of the embodiment of the present application, which will not be repeated herein for the sake of brevity.

The present disclosure has been described with reference to flowcharts and/or block diagrams of the methods, devices (systems) and computer program products according to embodiments of the present disclosure. It will be understood that each flow and/or block of the flowchart and/or block diagram and a combination of each flow and/or block of the flowchart and/or block diagram can be implemented by the computer program. These computer program instructions may be provided to the processors of the general purpose computer, a special purpose computer, an embedded processor, or other programmable data processing device to produce a machine, so that the instructions executed through the processors of the computer or other programmable data processing devices produce a device for implementing specific functions in one or more flows of the flowchart and/or in one or more blocks of the block diagram.

These computer program instructions may also be stored in a computer readable memory that can direct a computer or other programmable data processing devices to operate in a particular manner, such that the instructions stored in the computer readable memory produce a manufacture including the instruction apparatus, the instruction apparatus implements the functions specified in one or more blocks of the flowchart and/or one or more blocks of the block diagram.

These computer program instructions may also be loaded onto a computer or other programmable data processing devices, such that a series of operation steps are performed on the computer or other programmable devices to produce computer-implemented processing, thereby the instructions executed on the computer or other programmable devices are used to implement the functions specified in one or more flows of the flowchart and/or in one or more blocks of the flow diagram.

The above are only the preferred embodiments of the present disclosure, and are not intended to limit the scope of the present disclosure. Any modifications, equivalent substitutions and improvements made within the spirit and principles of the present disclosure should be included within the protection scope of the present disclosure.

What is claimed is:

1. A signal processing method, comprising:
   receiving, by a terminal device, first precoding indication information, wherein the first precoding indication information is used for indicating related information for precoding a data signal, and the first precoding indication information comprises information of a perturbation vector value and a symbol index corresponding to the perturbation vector value;
   determining, by the terminal device, a target perturbation vector on a symbol corresponding to the symbol index, based on the information of the perturbation vector value and the symbol index corresponding to the perturbation vector value; and
   restoring the data signal that is transmitted on the symbol corresponding to the symbol index, based on the target perturbation vector and a perturbation coefficient value.

2. The method according to claim 1, wherein indication of the information of the perturbation vector value is based on a predefined vector codebook;
   the information of the perturbation vector value indicates an index of a target perturbation vector in the vector codebook.

3. The method according to claim 1, wherein before the determining, by the terminal device, a target perturbation vector on a symbol corresponding to the symbol index, based on the information of the perturbation vector value and the symbol index corresponding to the perturbation vector value, the method further comprises:

normalizing, by the terminal device, the received data signal;

performing a linear detection on the normalized data signal.

4. A terminal device, comprising: a processor and a memory configured to store a computer program that is executable on the processor, wherein the computer program, when being executed by the processor, causes the processor to:

receive first precoding indication information, wherein the first precoding indication information is used for indicating related information for precoding a data signal, and the first precoding indication information comprises information of a perturbation vector value and a symbol index corresponding to the perturbation vector value;

determine a target perturbation vector on a symbol corresponding to the symbol index, based on the information of the perturbation vector value and the symbol index corresponding to the perturbation vector value; and restore the data signal that is transmitted on the symbol corresponding to the symbol index, based on the target perturbation vector and a perturbation coefficient value.

5. The terminal device according to claim 4, wherein indication of the information of the perturbation vector value is based on a predefined vector codebook;

the information of the perturbation vector value indicates an index of a target perturbation vector in the vector codebook.

6. The terminal device according to claim 4, wherein, the computer program, when being executed by the processor, further causes the processor to:

normalize the received data signal and perform a linear detection on the normalized data signal.

7. A signal processing method, comprising:

receiving, by a terminal device, first precoding indication information, wherein the first precoding indication information is used for indicating related information for precoding a data signal, and the first precoding indication information comprises information of a perturbation vector value;

normalizing, by the terminal device, the received data signal;

performing a linear detection on the normalized data signal, determining, by the terminal device, a target perturbation vector on a symbol corresponding to a symbol index, based on the information of the perturbation vector value; and restoring the data signal, based on the target perturbation vector and a perturbation coefficient value.

8. The method according to claim 7, wherein indication of the information of the perturbation vector value is based on a predefined vector codebook;

the information of the perturbation vector value indicates an index of a target perturbation vector in the vector codebook.

* * * * *